United States Patent
Shinomoto et al.

(10) Patent No.: US 8,508,165 B2
(45) Date of Patent: Aug. 13, 2013

(54) AC-DC CONVERTER, METHOD OF CONTROLLING THE SAME, MOTOR DRIVER, COMPRESSOR DRIVER, AIR-CONDITIONER, AND HEAT PUMP TYPE WATER HEATER

(75) Inventors: Yosuke Shinomoto, Tokyo (JP); Hideki Takahara, Tokyo (JP); Masato Handa, Tokyo (JP); Makoto Tanikawa, Tokyo (JP); Mitsuo Kashima, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 255 days.

(21) Appl. No.: 13/002,221

(22) PCT Filed: Aug. 1, 2008

(86) PCT No.: PCT/JP2008/063835
§ 371 (c)(1),
(2), (4) Date: Dec. 30, 2010

(87) PCT Pub. No.: WO2010/013344
PCT Pub. Date: Feb. 4, 2010

(65) Prior Publication Data
US 2011/0101898 A1 May 5, 2011

(51) Int. Cl.
*H02P 27/00* (2006.01)
*H02P 6/00* (2006.01)

(52) U.S. Cl.
CPC ...................... *H02P 6/001* (2013.01)
USPC ......... 318/400.3; 318/432; 318/801; 318/375

(58) Field of Classification Search
CPC ...................................... H02P 6/001
USPC ................................ 318/400.3, 432, 375, 801
See application file for complete search history.

(56) References Cited

U.S. PATENT DOCUMENTS

| 4,118,750 A | * | 10/1978 | Auer et al. ................. 361/182 |
| 5,479,336 A | | 12/1995 | Motoki et al. |
| 6,181,583 B1 | * | 1/2001 | Okui et al. .................. 363/45 |

(Continued)

FOREIGN PATENT DOCUMENTS

| CN | 1753294 A | 3/2006 |
| EP | 0 932 249 A1 | 7/1999 |

(Continued)

OTHER PUBLICATIONS

International Search Report (PCT/ISA/210) issued on Aug. 26, 2008, by Japanese Patent Office as the International Searching Authority for International Application No. PCT/JP2008/63835.

(Continued)

*Primary Examiner* — Bentsu Ro
*Assistant Examiner* — David Luo
(74) *Attorney, Agent, or Firm* — Buchanan Ingersoll & Rooney PC

(57) ABSTRACT

A rectifier connected with an AC source through a reactor, a plurality of capacitors connected in series between output terminals of the rectifier, first switching means connected between one input terminal of the rectifier and a connection point of a plurality of capacitors, second switching means connected between the other input terminal of the rectifier and the connection point of a plurality of capacitors, and a plurality of diodes connected with the plurality of capacitors in inverse-parallel are provided.

21 Claims, 10 Drawing Sheets

(56) References Cited

U.S. PATENT DOCUMENTS

| | | | |
|---|---|---|---|
| 6,244,061 | B1* | 6/2001 | Takagi et al. .................... 62/229 |
| 6,984,948 | B2* | 1/2006 | Nakata et al. ............ 318/400.02 |
| 7,274,579 | B2* | 9/2007 | Ueda et al. .................... 363/125 |
| 2004/0183490 | A1 | 9/2004 | Maeda |
| 2005/0057210 | A1 | 3/2005 | Ueda et al. |
| 2007/0126384 | A1 | 6/2007 | Takata et al. |

FOREIGN PATENT DOCUMENTS

| | | |
|---|---|---|
| JP | 59-198873 A | 11/1984 |
| JP | 61-224866 A | 10/1986 |
| JP | 7-007946 A | 1/1995 |
| JP | 10-191640 A | 7/1998 |
| JP | 2000-125545 A | 4/2000 |
| JP | 2001-145360 A | 5/2001 |
| JP | 2003-009535 A | 1/2003 |
| JP | 2004-129357 A | 4/2004 |
| JP | 2004-229462 A | 8/2004 |
| JP | 2005-094982 A | 4/2005 |
| JP | 2005-110491 A | 4/2005 |
| JP | 2007-110779 A | 4/2007 |
| JP | 2008-022625 A | 1/2008 |
| JP | 2008-099512 A | 4/2008 |
| JP | 2008-172999 A | 7/2008 |

OTHER PUBLICATIONS

Hoshi et al., "A Switching Pattern Decision Scheme for Single-phase Multi-level Rectifiers", Proceedings of the Japan Industry Applications Society Conference, 2005, pp. 263-264 (partial English translation enclosed).

"Input Waveform Improvement of Single-phase Converter by Multi-level Voltage", pp. 5-30. (partial English translation enclosed).

Hoshi et al., "Harmonic Control Scheme using Genetic Algorithm for Single-phase Multi-level Rectifiers", IEEJ Trans. IA, 2006, pp. 88-89, vol. 126, No. 1 (partial English translation enclosed).

Oguchi et al., "Proposal of a Multilevel-Voltage Source Type Rectifier Having a Three-Phase Diode Bridge Circuit as a Main Power Circuit", T. IEE Japan, 1992, pp. 497-498, vol. 112-D, No. 5 (partial English translation enclosed).

Office Action from Australian Patent Office dated Nov. 8, 2012, issued in corresponding Australian Patent Application No. 2008360120.

Office Action from the Japan Patent Office dated Nov. 27, 2012, issued in corresponding Japanese Patent Application No. 2010-522573, with English translation thereof.

Office Action from Chinese Patent Office dated Nov. 16, 2012, issued in corresponding Chinese Patent Application no. 200880130527.9, with English translation thereof.

Office Action from the Japan Patent Office dated Apr. 16, 2013, issued in corresponding Japanese Patent Application No. 2010-522573, with English translation thereof.

Extended Search Report from European Patent Office dated Jun. 5, 2013, issued in corresponding European Patent Application No. 08792048.4.

Oguchi et al. "A Novel Control Method for Single-Phase Slow Switching Multilevel Rectifiers," Conference Record of the 2002 IEEE Industry Applications Conference: 37th IAS Annual Meeting; Oct. 13-18, 2002, Pittsburgh, PA, USA; IEEE Service CE, Oct. 13, 2002, pp. 1966-1973, vol. 3, XP032143359.

Lin et al. "A New Control Scheme for Single-Phase PWM Multilevel Rectifier with Power-Factor Correction," IEEE Transactions on Industrial Electronics, Aug. 1, 1999, IEEE Service Center, Piscataway, NJ, USA, vol. 46, No. 4, XP011023545.

* cited by examiner

F I G. 1 2
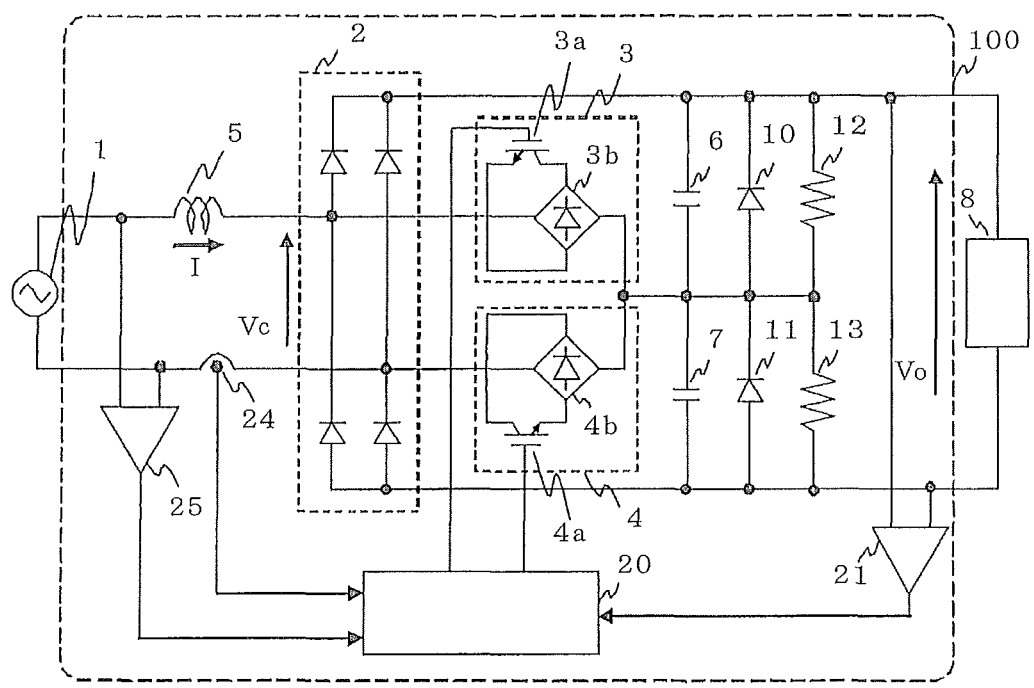

AC-DC CONVERTER, METHOD OF CONTROLLING THE SAME, MOTOR DRIVER, COMPRESSOR DRIVER, AIR-CONDITIONER, AND HEAT PUMP TYPE WATER HEATER

TECHNICAL FIELD

The present invention relates to an apparatus that converts AC to DC.

BACKGROUND ART

Conventionally, as a technique intended "to obtain a DC power unit that reduces harmonic components of an input current to optimally improve power factor", the technique is proposed such that "when an AC voltage of an AC source passes at a zero point, switching means is made to perform a closing operation after a preset first delay time from the pass time and switching means is made to perform an opening operation after a preset second delay time from the pass time." (Patent Literature 1)

Further, as a technique intended "to lower a processing speed in control, to improve power factor, to reduce harmonics, and to achieve low cost by reducing the frequency of switching to achieve a minimal switching frequency", the technique is proposed such that "there are provided a rectification circuit 2 that rectifies the voltage of an AC source 1, a smoothing capacitor 4 that smoothes the output voltage from the rectification circuit 2, switching means 6 that is disposed at the AC source 1 side from the smoothing capacitor 4, a reactor 3 that is disposed at the power source side from the switching means 6, load amount detection means 10 that detects load amount of the load connected in parallel to the smoothing capacitor 4, and control means 8 that performs opening and closing control of the switching means at least twice in half a cycle of the power source in synchronization with the power source period of the AC source 1 in an opening and closing time according to load amount." (Patent Literature 2)

Furthermore, as a technique intended "to provide a power unit that can smoothly adjust a wide range of output voltage from a voltage by full-wave rectification to not less than the voltage by voltage doubler rectification while performing power factor improvement with a simple configuration and satisfying restrictions on harmonics", the technique is proposed such that "a switch SW1 connected between an input terminal of a rectification circuit 2 and a connection point between capacitors 4 and 5 for voltage doubler and the switch SW2 connected between the other input terminal of the rectification circuit 2 and the connection point between capacitors 4 and 5 are provided in a power unit. In an operation mode 1, the switch SW1 is controlled continuously to be on from a zero-cross time of a supply voltage only for an on-period in which the voltage varies according to an output voltage, and the switch SW2 is controlled to be always off. In an operation mode 2, the switch SW1 is controlled continuously to be on from a zero-cross time of a supply voltage only for an on-period, and the switch SW2 is controlled to be always on." (Patent Literature 3)

Moreover, as a technique intended "to provide an inverter air-conditioner capable of achieving a maximum rotation speed increase of a compressor with a simple configuration, high power factor, harmonics suppression, and expansion of a variable range of an output voltage", the technique is proposed such that "a capacitor circuit connected between two output terminals of a rectification circuit, first switching means 7 connected between one input terminal of the rectification circuit and a connection point in the capacitor circuit, and second switching means connected between the other input terminal of the rectification circuit and the connection point in the capacitor circuit are provided. By switching the first and the second switching means 7 and 8 suitably, high power factor and harmonics suppression become compatible and maximum ability and efficiency of the air-conditioner can be improved." (Patent Literature 4)

Moreover, as a technique intended "to make it possible to generate a voltage which is equal to or larger than an input voltage in a converter circuit converting an output voltage of an AC source 1 without using a reactor and a large capacity capacitor", the technique is proposed such that "in the converter circuit 100 converting the output voltage of the AC source 1, there are provided a rectification circuit 20 for rectifying the output voltage of the AC source 1, a first and a second capacitors 31 and 32 connected in series for smoothing the output of the rectification circuit 20, and a switching circuit 40 for switching the connection between the above both capacitors 31 and 32 and the AC source so that the output voltage of the AC source 1 is alternately repetitively applied to the first and the second capacitors 31 and 32 with a period shorter than that of the AC source." (Patent Literature 5)

Moreover, as a technique intended "to provide a power unit that satisfies power line harmonics regulations and in which boosting performance and input power factor of the power unit can be compatible at a high level", the technique is proposed such that "in a power unit comprising; a rectification circuit, a capacitor circuit constituted by a plurality of capacitors connected in series, being connected between two output terminals of the rectification circuit, first switching means connected between either of the input terminal of the rectification circuit and one connection point between capacitors in the capacitor circuit, second switching means connected between the other input terminal of the rectification circuit and one connection point between capacitors in the capacitor circuit, and zero-cross detection means that detects a zero-cross point of the AC source, for each half a cycle of the AC source, after both the first and the second switching means are powered on for a predetermined time t1 after a zero-cross point of the AC source, and after the second switching means is powered off for a predetermined time t2, the first and the second switching means 7 and 8 are powered off." (Patent Literature 6)

A technique is proposed that controls the input current to be almost sinusoidal and suppresses harmonics to improve power factor by performing high-frequency PWM (Pulse Width Modulation) operation of switching means. (Patent Literature 7)

As a technique whose problem is that "in a configuration where a full-wave rectification circuit constituted by a single-phase AC power unit and diodes, a reactor, a capacitor series circuit, a bi-directional switch, and a load are connected, when making an AC input current to have a high power factor by switching the bi-directional switch, the voltage of the capacitor connected in series becomes imbalanced during a half-cycle period", the technique is proposed such that "in a configuration such that a reactor is connected with one of the AC input terminals of a full-wave rectification circuit composed of a single-phase AC power unit and diodes, a capacitor series circuit is connected between the DC output of the full-wave rectification circuit, bi-directional switches 10 and 11 are connected between internal connection points of the capacitor series circuit and each AC input of the full-wave rectification circuit, and a load 14 is connected in parallel with the capacitor series circuit, respectively, voltages of the capacitors 12 and 13 connected in series are detected and bi-directional switches 10 and 11 are on-off controlled at high frequency in such a way that the voltages become even" (Patent Literature 8)

A technique is proposed that suppresses a harmonic current by operating two switching elements. (Non-patent Literature 1)

CITATION LIST

Patent Literature

Patent Literature 1 Japanese Unexamined Patent Application Publication No. H07-7946
Patent Literature 2 Japanese Unexamined Patent Application Publication No. 2000-125545
Patent Literature 3 Japanese Unexamined Patent Application Publication No. 2003-9535
Patent Literature 4 Japanese Unexamined Patent Application Publication No. 2004-129357
Patent Literature 5 Japanese Unexamined Patent Application Publication No. 2005-110491
Patent Literature 6 Japanese Unexamined Patent Application Publication No. 2008-99512
Patent Literature 7 Japanese Patent No. 2140103 Literature 8 Japanese Unexamined Patent Application Publication No. 2008-22625
Non-patent Literature 1 Shinichi Hoshi, Oguchi Kuniomi, "A Switching Pattern Decision Scheme for Single-phase Multi-level Rectifiers", Proceedings of the Japan Industry Applications Society Conference 2005, No. 1-61

SUMMARY OF INVENTION

Technical Problem

According to a technique described in the above Patent Literature 1, a reactor inadvantageously becomes large when harmonic current is made to be suppressed to be equal to or less than a restricted value.

According to a technique described in the above Patent Literature 2, a reactor can be down-sized without changing harmonic suppression performance. However, in order to increase in switching frequencies, power consumption inadvantageously increases. Further, when the input current increases, the reactor inadvantageously becomes large even if an inductance value is the same.

According to a technique described in the above Patent Literature 7, it is possible to suppress harmonics, however, since it is current control in which an input current is detected and made to be a sinusoidal waveform, a high-speed processing control is required and high-frequency PWM control becomes necessary. The high-frequency PWM control generates a large amount of noises, resulting in an increase in cost for countermeasures for noises. Analog control is performed using high processing performance microcomputers and dedicated ICs (Integrated Circuit) for high-speed control processing, resulting in a complicated peripheral circuit configurations and an increase in a circuit cost.

According to techniques described in the above Patent Literatures 3 and 4, variable ranges of DC voltages become large, however, a problem of a large reactor cannot be solved because of low-frequency switching.

According to the technique described in the above Patent Literatures 5, a capacitance of a capacitor can be made small by performing complimentary switching at higher frequencies than the power unit frequency. However, since it is complimentary switching to make the capacitance of the capacitor to be small, it is difficult to sufficiently reduce a power line harmonic current.

According to the technique described in the above Patent Literatures 6, it is possible to improve input power factor, however, it is difficult to make the reactor sufficiently small.

According to the technique described in the above Patent Literatures 8, current control is performed by detecting and controlling the current like Patent Literature 7, so that harmonics PWM control is required, resulting in problems of cost.

With a technique described in the non-Patent Literature 1, an ON/OFF timing of the switching means is obtained using a GA (Gestational Age). The GA needs long-time operations to obtain an optimal solution, therefore, each parameter obtained by executing operations in advance needs to be stored in the storage.

Accordingly, a longer development period and a larger capacity for storing each parameter are needed in order to apply the GA to products having a number of models.

The present invention is made to solve the above-mentioned problems and its object is to suppress harmonic currents to improve power factor at lower cost and to downsize a reactor.

Solution to Problem

An AC to DC converter according to the present invention includes a rectifier that is connected with an AC source via a reactor, a plurality of capacitors connected in series between output terminals of the rectifier, first switching means connected between one input terminal of the rectifier and a connection point of the plurality of capacitors, second switching means connected between the other input terminal of the rectifier and the connection point of the plurality of capacitors, and a plurality of diodes connected in inverse-parallel with the plurality of capacitors.

Advantageous Effects of Invention

According to an AC to DC converter of the present invention, by controlling an ON/OFF timing of first and second switching means, it is possible to output a three-level converter voltage while performing time-width control to output a sinusoidal converter voltage.

Thus, the current flowing through the reactor can be controlled to be sinusoidal, achieving the small-sized reactor.

Since a three-level converter voltage is output while controlling time-width, switching operation can be performed at a low frequency and the converter can be put into practical use inexpensively by reducing cost for high-frequency noise countermeasures.

BRIEF DESCRIPTION OF DRAWINGS

FIG. 12 is a circuit diagram of the AC to DC converter 100 according to Embodiment 5.

REFERENCE SIGNS LIST

Figure 1:
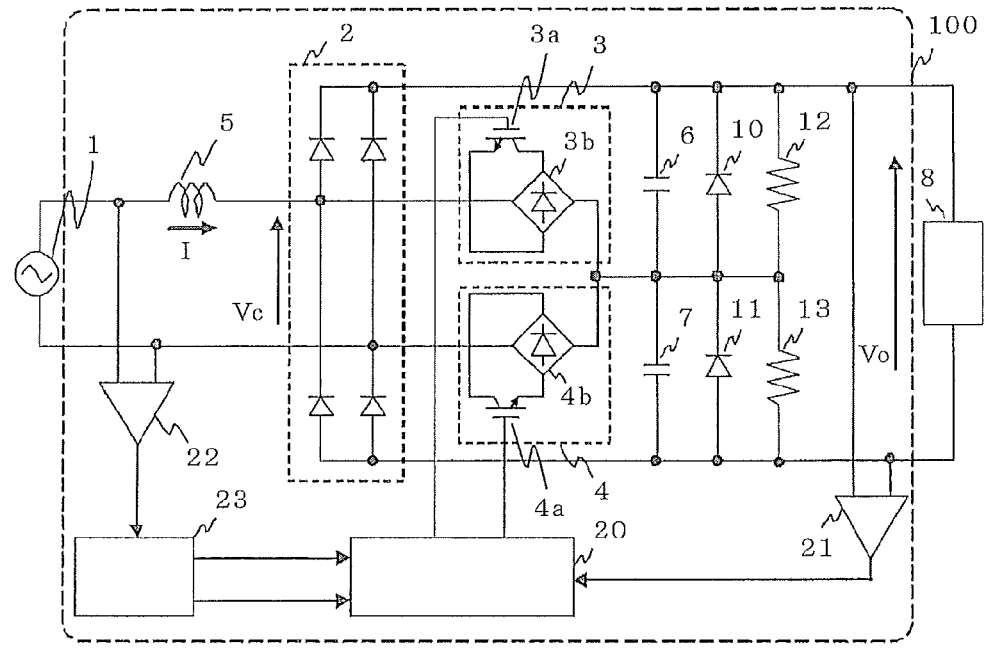
FIG. 1 is a circuit diagram of an AC to DC converter 100 according to Embodiment 1.

1 AC source
2 rectifier
3 first switching means
4 second switching means
5 reactor
6 first capacitor
7 second capacitor
8 DC load
10 first diode
11 second diode
12 first resistor
13 second resistor
14 diode rectifier
17 permanent magnet motor
18 inverter
19 voltage clamp portion
20 control means
21 first voltage detector
22 second voltage detector
23 effective value operation portion
24 current detector
25 zero-cross detector
26 inverter control portion

DESCRIPTION OF EMBODIMENTS

Example 1

FIG. 1 is a circuit diagram of an AC to DC converter 100 according to Embodiment 1. The circuit of FIG. 1 includes an AC source 1, a rectifier 2, first switching means 3, second switching means 4, a reactor 5, a first capacitor 6, a second capacitor 7, a DC load 8, a first diode 10, a second diode 11, a first resistor 12, a second resistor 13, control means 20, a first voltage detector 21, a second voltage detector 22, and an effective value operation portion 23.

The AC source 1 supplies AC power from outside of the AC to DC converter 100. The rectifier 2 rectifies the AC power of the AC source 1 to the DC power. One end of the first switching means 3 is connected with one of the input terminals of the rectifier 2, and the other end with the connection point between the first capacitor 6 and the second capacitor 7. One end of the second switching means 4 is connected with the other of the input terminals of the rectifier 2, and the other end with the connection point between the first capacitor 6 and the second capacitor 7.

The reactor 5 is connected between the AC source 1 and the first switching means 3 or the second switching means 4 and has a function to suppress a harmonic current.

The first capacitor 6 is connected with one of output terminals of the rectifier 2.

The second capacitor 7 is connected with the other output terminal of the rectifier 2.

The DC load 8 is connected with the output of the rectifier 2.

The first diode 10 is connected with the first capacitor 6 in parallel, the second diode 11 with the second capacitor 7 in parallel.

The first resistor 12 is connected with the first capacitor 6 in parallel, the second resistor 13 with the second capacitor 7 in parallel.

The first diode 10 and the second diode 11 have an inverse polarity to the first capacitor 6 and the second capacitor 7, being connected under a reverse parallel condition.

The first switching means is bi-directional switching means constituted by an IGBT (Insulated Gate Bipolar Transistor) 3a and a diode rectifier 3b, for example.

The second switching means 4 is bi-directional switching means constituted by the IGBT 4a and the diode rectifier 4b in the same way.

The control means 20 drives and controls the first switching means 3 and the second switching means 4.

The control means 20 can be configured by hardware such as circuit devices offering its function, and by operation devices such as a microcomputer and a CPU (Central Processing Unit) and software that specifies its operations.

The first voltage detector 21 detects an output terminal voltage of the rectifier 2 to output detection results to the control means 20.

The second voltage detector 22 detects a voltage of the AC source 1 to output detection results to the control means 20.

Figure 6:
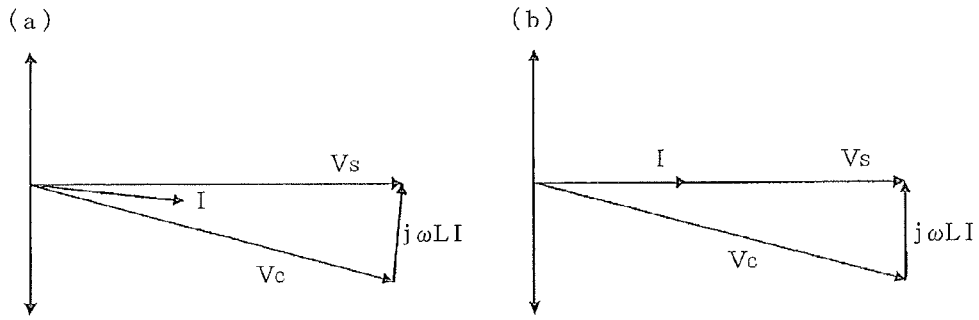
FIG. 6 is a diagram showing a vector relation of the circuit explained in FIG. 3.

The effective value operation portion 23 calculates an effective value to be described in FIG. 6 to output calculation results to the control means 20.

The effective value operation portion 23 can be configured by hardware such as a circuit device that offers its function, or by an operation device such as a microcomputer and a CPU and software that specifies its operations.

Descriptions are given to configurations of the AC to DC converter 100 according to Embodiment 1.

Next, operations of the AC to DC converter 100 according to Embodiment 1 will be explained while comparing with a conventional technique.

Figure 2:
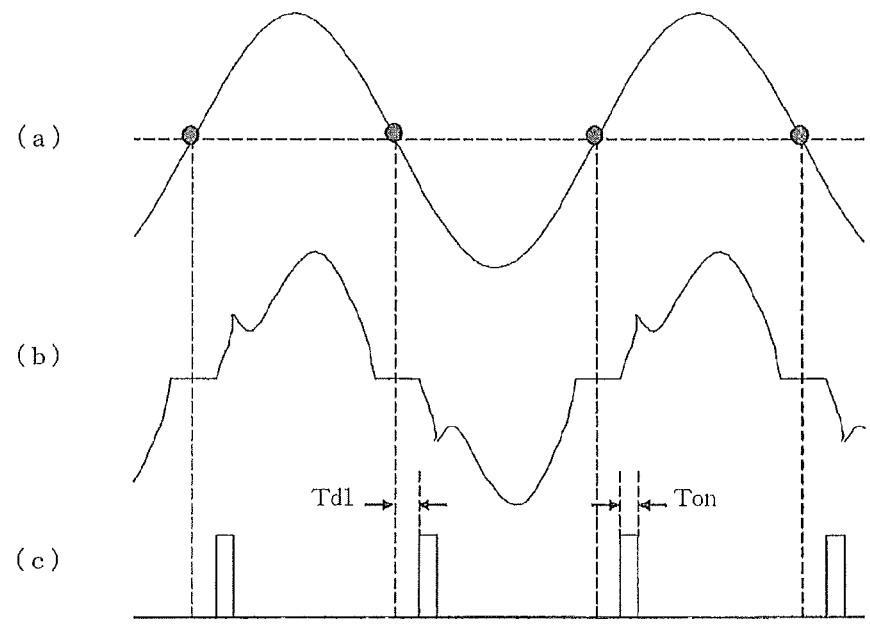
FIG. 2 is a diagram showing a relation of operations among a supply voltage, an input current, and switching means.

FIG. 2 is a diagram showing a relation of operations among a source voltage, an input current, and switching means in the prior art.

Here, as described in Patent Literature 3, an example is given in which the first switching means 3 performs a one-pulse short-circuit operation with respect to half a cycle of the power source and the second switching means 4 is disposed for switching from a full-wave rectification to a voltage doubler rectification and vice versa.

FIG. 2(a) shows a supply voltage waveform, FIG. 2(b) an input current waveform, and FIG. 2(c) an operation waveform of the first switching means 3, respectively.

A one-pulse short-circuit operation of with respect to half a cycle of the power source yields a spiked input current waveform like FIG. 2(b).

A current flows through the first switching means 3 by turning on the first switching means 3 for a predetermined time width Ton after an elapse of a predetermined delay time Td1 from a zero-cross point (a dark spot in FIG. 2) of the source voltage and a spiked current is added to yield the spiked input current.

Since the second switching means 4 is disposed for the purpose of switching the full-wave rectification and the voltage doubler rectification, it can be configured by a mechanical switch such as a relay.

The second switching means 4 enables the AC to DC converter to have two voltage reference levels of the output DC voltage applied to the DC load 8; the voltage by the full-wave rectification and the voltage by the voltage doubler rectification. Thus, the control range of the output voltage can be expanded.

As mentioned above, the relation of operation among the source voltage, input voltage, and the switching means in the prior art is explained using FIG. 2.

On the other hand, in the AC to DC converter according to Embodiment 1, the purpose of the operation of the first switching means 3 is the same as that of the second switching means 4. In the following, descriptions will be given to the operation of the AC to DC converter according to Embodiment 1.

Figure 3:
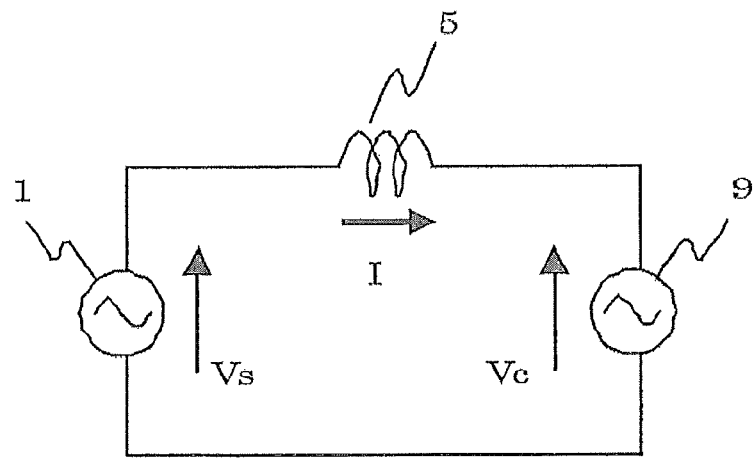
FIG. 3 is a circuit diagram equivalently showing operations of the AC to DC converter 100.

FIG. 3 is a circuit diagram equivalently showing operations of the AC to DC converter 100.

The operation of the AC to DC converter 100 can be equivalently treated as if a virtual AC source 9 were connected in series with the reactor 5. That is, the first switching means 3 and the second switching means 4 operate so that the AC to DC converter 100 becomes equivalent to the virtual AC source 9.

Next, operation of the virtual AC source 9 will be explained.

An electric current I flowing through the reactor 5 is defined by a voltage difference between the AC source 1 and the virtual AC source 9.

Since the reactor current I is a sinusoidal amount, a circuit equation of FIG. 3 is represented by (formula 1) as follows.

$$j\omega L I = V_s - V_c \quad \text{(formula 1)}$$

where,
ω: angular frequency
L: inductance of reactor 5
j: imaginary number.
$V_s$: voltage of AC source 1
$V_c$: voltage of virtual AC source 9

The voltage $V_s$ of the AC source 1 and the voltage $V_c$ of the virtual AC source 9 are supposed to be a sinusoidal shape and represented by (formula 2) and (formula 3) as follows.

$$V_s = \sqrt{2} V_1 \sin(\omega t) \quad \text{(formula 2)}$$

$$V_c = \sqrt{2} V_2 \sin(\omega t - \phi) \quad \text{(formula 3)}$$

where,
φ: phase difference between $V_s$ and $V_c$

When assuming V1=V2, the reactor current I can be expresses by (formula 4) as follows.

$$I = 1/(j\omega L) 2 \cos(\phi/2) \cos(\omega t - \phi/2) \quad \text{(formula 4)}$$

The phase difference φ between $V_s$ and $V_c$ does not change, cos (ωt−φ/2) becomes a constant. The constant part of (formula 4) is collectively defined by K, the reactor current I can be represented by (formula 5) as follows.

$$I = -j K \cos(\omega t - \phi/2) \quad \text{(formula 5)}$$

As mentioned above, the circuit equation of FIG. 3 is represented using the voltage $V_c$ of the virtual AC source 9.

From (formula 5), it can be said as follows.

That is, when the voltage $V_c$ of the virtual AC source 9 is sinusoidally output as represented by (formula 3), the reactor current I, in other words, the input current becomes sinusoidal. Thereby, harmonic current can be suppressed.

When the phase difference between the input current and the AC source 1 becomes zero, power factor of the power source becomes 100%.

Accordingly, by suitably controlling a voltage amplitude V2 of the virtual AC source and the phase difference 9 to output the sinusoidal voltage $V_c$, harmonics of the input current can be suppressed and the power factor can be improved.

In the Embodiment 1, the first switching means 3 and the second switching means 4 are driven and controlled so that the voltage $V_c$ between the input terminals of the rectifier 2 becomes almost sinusoidal.

Descriptions will be given to the operation of the first switching means 3 and the second switching means 4 to make the voltage $V_c$ to be almost sinusoidal.

Figure 4:
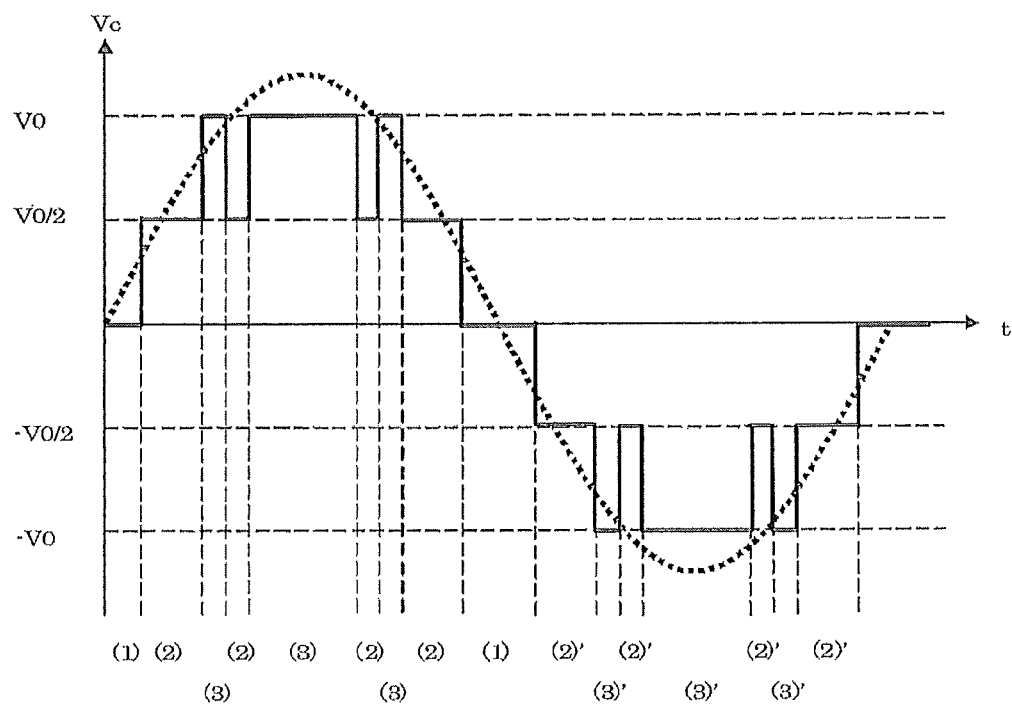
FIG. 4 is a diagram showing a waveform of an input terminal voltage Vc of a rectifier 2.

FIG. 4 is a diagram showing a waveform of an input terminal voltage Vc of a rectifier 2.

The voltage Vc takes three levels of output conditions, voltage 0, V0/2, and V0 shown in FIG. 4 according to the operation of the first switching means 3 and the second switching means 4. It is the same with respect to a reverse polarity. In addition, V0 is an output DC voltage applied to the DC load 8.

Operations of the first switching means 3 and the second switching means 4 will be explained by FIG. 5 in the following when taking output conditions of these three levels.

Figure 5:
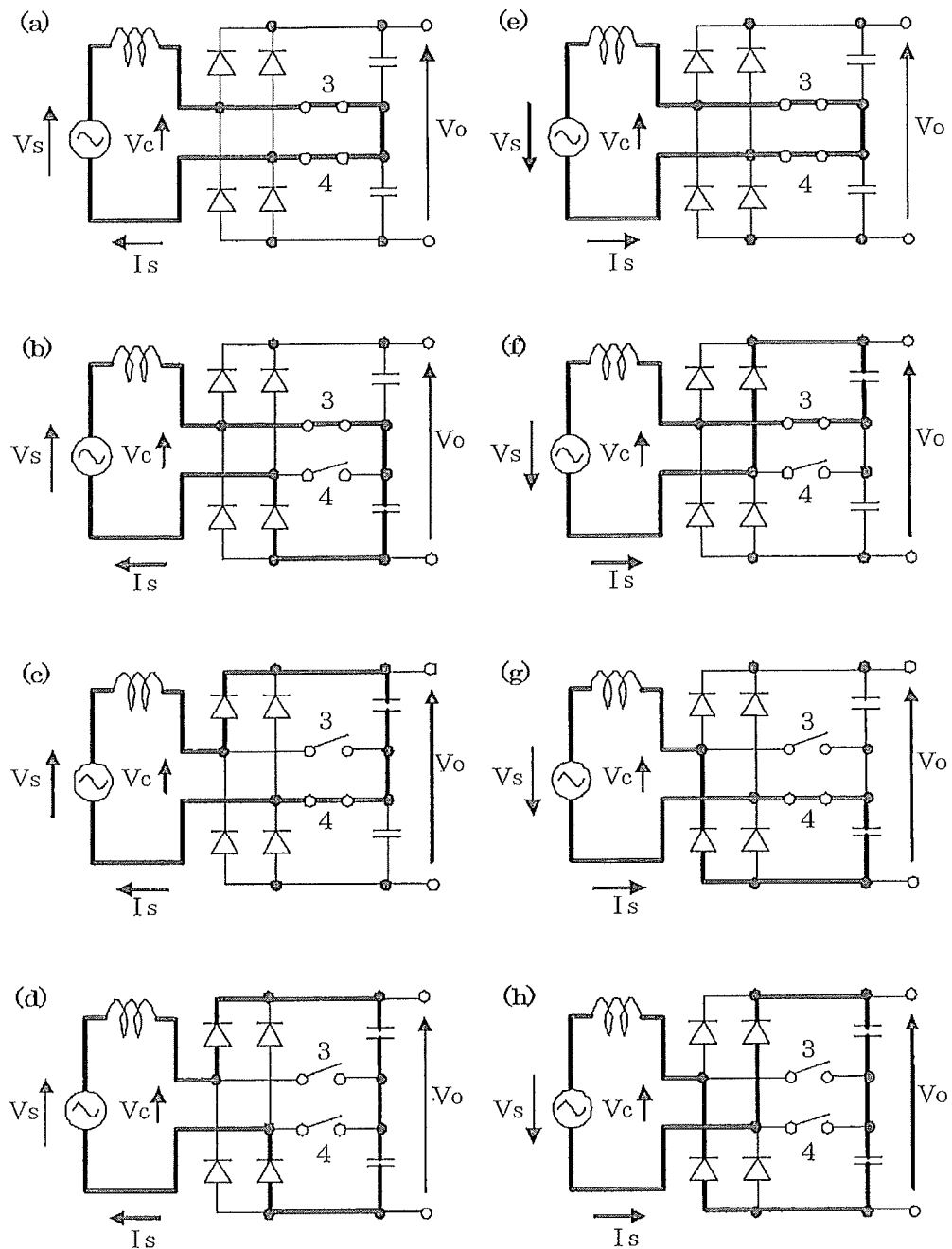
FIG. 5 illustrates operations of first switching means 3 and second switching means 4.

FIG. 5 illustrates operations of the first switching means 3 and the second switching means 4. Each switching state of FIG. 5 will be explained as follows.

(a) The first switching means 3 and the second switching means 4 are simultaneously turned on In the state of FIG. 5(a), the first switching means 3 and the second switching means 4 are simultaneously turned on. In this state, between the input terminals of the rectifier 2 is short-circuited, resulting in voltage Vc=0. That corresponds to the interval of FIG. 4(1).

(b) The first switching means 3 is turned on and the second switching means 4 is turned off In the state of FIG. 5(b), the first switching means 3 is turned on and the second switching means 4 is turned off. In this state, the voltage Vc between the input terminals of the rectifier 2 is equal to the voltage across the second capacitor 7.

Accordingly, the voltage Vc becomes half the output DC voltage V0, Vc=V0/2. That corresponds to the interval of FIG. 4(2).

(c) The first switching means 3 is turned off and the second switching means 4 is turned on In the state of FIG. 5(c), the first switching means 3 is turned off and the second switching means 4 is turned on. In this state, the voltage Vc between the input terminals of the rectifier 2 is equal to the voltage across the first capacitor 6.

Accordingly, the voltage Vc becomes half the output DC voltage V0, Vc=V0/2. That corresponds to the interval of FIG. 4(2).

(d) The first switching means 3 and the second switching means 4 are simultaneously turned off In the state of FIG. 5(d), the first switching means 3 and the second switching means 4 are simultaneously turned off. In this state, rectifier 2 becomes a full-wave rectification condition.

Accordingly, the voltage Vc between the input terminals of the rectifier 2 becomes equal to the voltage across the first capacitor 6 and the second capacitor 7, and the voltage Vc=V0. That corresponds to the interval of FIG. 4(3).

As shown in FIGS. 5(a) to 5(d), by driving and controlling each switching means, the voltage Vc between the input terminals of the rectifier 2, that is the converter voltage Vc, can take three-level voltage conditions.

By suitably controlling a timing of these 3-level voltage conditions, voltage waveforms such as intervals (1) to (3) in FIG. 4 can be generated and Vc can be output almost sinusoidally.

In addition, FIGS. 5(e) to 5(h) differ from FIGS. 5(a) to 5(d) only in that the polarity of the AC source 1 is reversed. FIGS. 5(e) to 5(h) correspond to intervals (1)' to (3)' in FIG. 4.

As mentioned above, operations of the first switching means 3 and the second switching means 4 to make the voltage Vc to be almost sinusoidal is explained.

As explained above, in Embodiment 1, by making the output voltage level to be multi-stage (3 levels, 0, V0/2, and V0) compared with the prior art, the switching frequency is lowered and harmonic current is suppressed to enable the reactor 5 to be downsized.

Therefore, according to Embodiment 1, by driving and controlling the first switching means 3 and the second switching means 4 as explained in FIGS. 4 and 5, the voltage Vc between the input terminals of the rectifier 2, that is the converter voltage Vc, can be output almost sinusoidally.

Thereby, while making the switching frequency to be low, the reactor 5 can be downsized compared with a conventional technique, in which the switching means is made to operate once or several times for half a cycle of the voltage source.

According to Embodiment 1, since the output voltage is made to be multi-leveled, it is possible to perform PWM control in which drive and control is performed at a low switching frequency of, for example, 1 kHz to 5 kHz.

Thereby, cost increase for noise reduction in such as performing high-frequency PWM control can be prevented.

This is achieved because the input current can be almost sinusoidally controlled only by sinusoidally outputting the converter voltage Vc without controlling the input current. That is, high-frequency control operation becomes unnecessary because of no control of the input current.

Embodiment 2

In Embodiment 1, it is explained that by sinusoidally outputting the converter voltage Vc, the input voltage is made to be almost sinusoidal and harmonics can be suppressed.

In Embodiment 2, descriptions will be given to the control of the value of the output DC voltage V0 of the AC to DC converter 100. Circuit configuration of the AC to DC converter 100 is the same as Embodiment 1.

Under the conditions of FIGS. 5(b), 5(c), 5(f), and 5(g) explained in Embodiment 1, the connection point of the first capacitor 6 and the second capacitor 7 is connected with one end of the AC source 1. Therefore, the same circuit configuration as the voltage doubler rectification is formed.

Like those conditions, when only either of the switching means is turned on, in other words, by properly controlling the ratio to be Vc=V0/2, it is possible to control the value of the output DC voltage V0 to be equal to or larger than a DC voltage value obtained by the full-wave rectification.

In Non Patent Literature 1, descriptions are given to a technique in Which control is performed by obtaining an operation timing of the switching means in advance by calculation.

An ON/OFF timing of the switching means can be set according to the phase angle without limit, therefore, innumerable candidates exist for solutions obtained by calculation. It was virtually difficult to obtain the ON/OFF timing for making the output DC voltage V0 to be a desired value under the above assumption.

Accordingly, a method is proposed in which using GA an optimal ON/OFF timing is searched in Non Patent Literature 1.

However, no method has ever been found for searching the ON/OFF timing capable of making the output DC voltage V0 to be a desired value in addition to suppressing harmonics.

Moreover, in the case of products whose load conditions in operation change or whose model number is too many, a method of searching an optimal solution from infinitely existing ON/OFF timings is difficult to put into practice.

In Embodiment 2, the ON/OFF timing is determined by feedback control instead of obtaining the ON/OFF timing by calculation in advance. In the following, a method of determining the ON/OFF timing in Embodiment 2 will be explained.

FIG. 6 is a diagram showing a vector relation of the circuit explained in FIG. 3.

Due to the affect of the reactor 5, the reactor current I becomes phase lag against the voltage Vs of the AC source 1. A voltage drop $j\omega LI$ is generated in the reactor 5 so as to be orthogonal to the reactor current I. The result of vector addition of the voltage between the input terminals of the rectifier 2, which is the converter voltage Vc, with the voltage drop $j\omega LI$ coincides with the voltage Vs of the AC source 1.

In order to output the converter voltage Vc so as to make power factor to be 1, the voltage Vs needs to be orthogonal to the voltage drop $j\omega LI$ as shown in FIG. 6(b).

That is, the phase angle of the converter voltage Vc has only to be controlled so that a phase lag $\phi$ against the AC source 1 of the converter voltage Vc becomes (formula 6) as follows.

$$\phi = \tan^{-1}(\omega LI/V_1) \quad \text{(formula 6)}$$

An amplitude V2 of the converter voltage Vc has only to be output so as to be the value of (formula 7) as follows.

$$V2 = \sqrt{(V_1^2 + (\omega LI)^2)} \quad \text{(formula 7)}$$

When configuring a control system so that a phase angle and an amplitude of the output DC voltage V0 are uniquely determined, operation signals of the first switching means 3 and the second switching means 4 can be generated by applying such as saw-tooth wave modulation, triangular wave modulation, space vector modulation, and dipolar modulation.

Figure 7:
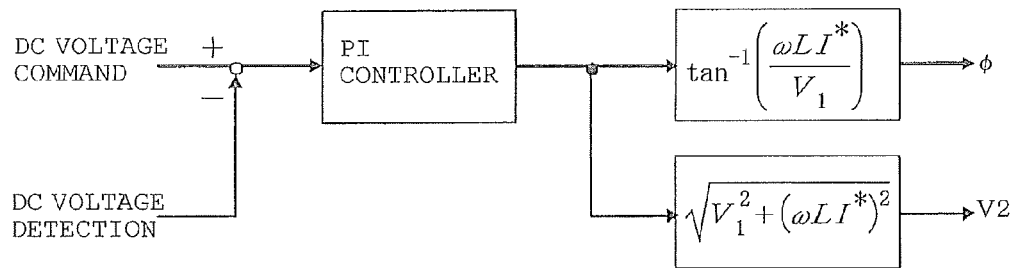
FIG. 7 is a control block diagram of control means 20.

FIG. 7 is a control block diagram of the control means 20. Here, an example is given for performing PI control.

A difference is input into a PI controller between a command value of the DC voltage and a detection value V0 of the DC voltage by a first voltage detector 21. The output of the PI controller is a current command value I*.

By substituting the current command value I* into the above (formula 6) and (formula 7), the phase angle $\phi$ and the amplitude V2 can be calculated.

The ON/OFF timing of the first switching means 3 and the second switching means 4 may be determined based on the phase angle $\phi$ and the amplitude V2 obtained by the above procedure.

Next, a method of coping with the change of the AC source 1 will be explained.

The phase angle $\phi$ is a function of the voltage Vs and the input current I of the AC source 1. When the voltage Vs of the AC source 1 is supplied according to a rated value (200V, for example), the AC source 1 may be controlled with the value of V1 in the control block explained in FIG. 7 being the rated value.

However, in the case where the voltage of the AC source 1 varies and becomes a value other than the rated voltage, when control is performed with the value of V1 in the control block in FIG. 7 being the rated value, power factor does not become 1 to be lowered.

This phenomenon will be explained using FIG. 8 as follows.

Figure 8:
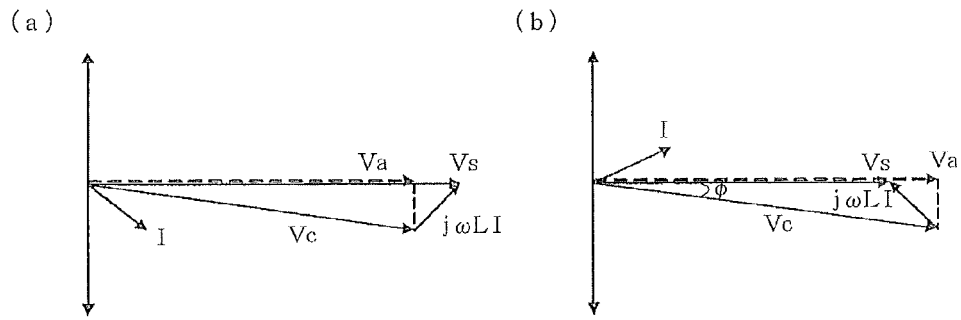
FIG. 8 is a diagram showing variations of power factor through changes of the voltage of an AC source 1.

FIG. 8 is a diagram showing variations of power factor through changes of the voltage of the AC source 1. The rated voltage of the AC source 1 is specified as Va.

FIG. 8(*a*) shows a vector diagram when the voltage Vs becomes larger than the rated voltage Va, and FIG. 8(*b*) the vector diagram when the voltage Vs becomes smaller than the rated voltage Va.

Under the state of FIG. 8(*a*), the input current I becomes a lagging phase and it is not possible to control with the power factor=1.

Under the state of FIG. 8(*b*), the input current I becomes an advanced phase and it is not possible to control with the power factor=1, as well.

That is, it is found that when the input current I becomes the lagging phase and advanced phase, the power factor is lowered.

In order to maintain a power factor improvement effect, it has only to detect the power factor to keep the state of power factor=1. In order to detect the power factor, it is usually necessary to detect both the voltage Vs and the input current I of the AC source 1.

However, with the AC to DC converter 100 according to Embodiment 2, control is performed based on the principle of FIG. 3 so that vector relations of each value become FIG. 6(*b*), power factor reduction due to voltage variations of the AC source 1 can be coped with only by detecting the voltage Vs of the AC source 1.

On the other hand, the amplitude V2 of the converter voltage Vc is subjected to voltage variations of the AC source 1 like the phase difference φ, however, the voltage Vs of the AC source 1 has only to be detected.

It is found that the voltage of the AC source 1 to be detected is a voltage effective value of the AC source 1 by the vector diagram of FIG. 6(*b*).

Therefore, an effective value operation portion 23 calculates a voltage effective value of the AC source 1 based on a detection value of the second voltage detector 22 and control means 20 uses the calculation value for performing control.

The effective value operation portion 23 detects the phase angle of the AC source 1 using a zero-cross point of the voltage of the AC source 1 detected by the second voltage detector 22. The control means 20 use the phase angle of the AC source 1 when controlling the phase angle of the converter voltage Vc.

Then, in order to synchronize the phase angle φ with the phase of the AC source 1, such as PLL (Phase Locked Loop) circuit may be employed. Thereby, it is possible to improve precision of the phase angle φ to further reduce harmonics current.

According to the procedure explained above, the converter voltage Vc can be decided.

Based on the decided converter voltage Vc, general unipolar modulation, for example, can be employed as a method of deciding the ON/OFF timing of the first switching means 3 and the second switching means 4.

Figure 9:
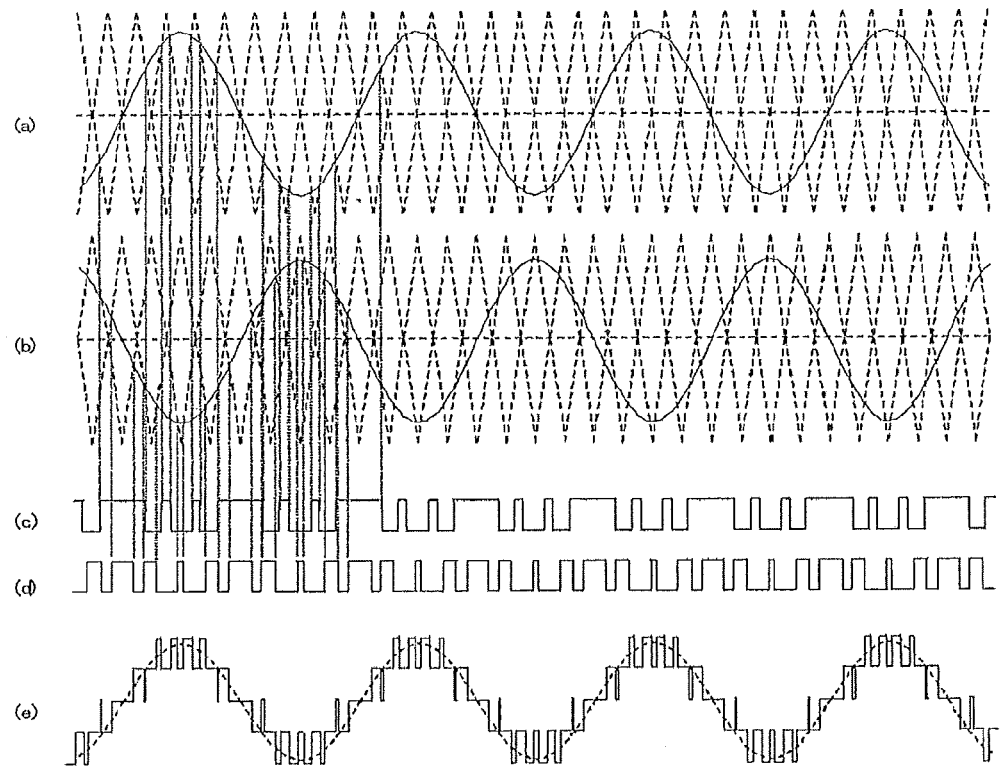
FIG. 9 is a waveform diagram showing a modulation signal that specifies an ON/OFF timing of each switching means.

FIG. 9 is a waveform diagram showing a modulation signal that specifies the ON/OFF timing of each switching means. Descriptions will be given to FIG. 9 as follows.

FIG. 9(*a*) shows a modulation signal of the first switching means 3. FIG. 9(*b*) shows a modulation signal of the second switching means 4. Sinusoidal waveforms in FIGS. 9(*a*) and 9(*b*) are the converter voltage Vc.

since an absolute value of the negative electrode side corresponds to the value of the positive electrode side, the modular signal of the figure can be said to be a unipolar modulation method.

In FIG. 9(*a*), the first switching means 3 is turned off in the interval where the converter voltage Vc is larger than a triangle wave, which is a carrier wave.

FIG. 9(*c*) is the ON/OFF timing of the first switching means 3. Hi-side is ON and Lo-side is OFF.

Since the second switching means 4 is on the negative side to the converter voltage Vc, the waveform of the modulation signal becomes FIG. 9(*b*), which is 180-degree inverse of the phase of FIG. 9(*a*).

In the same way as FIG. 9(*c*), the waveform of FIG. 9(*d*) can be obtained, which is the ON/OFF timing of the second switching means 4.

The converter voltage Vc can be obtained by summing waveforms of FIGS. 9(*c*) and 9(*d*).

However, in FIGS. 9(*c*) and 9(*d*), the Hi-side is ON of the switching means, therefore, addition is performed with Hi being 0 and Lo being 1 for the sake of simple explanation.

Then, the chopped converter voltage Vc of FIG. 9(*e*) can be obtained.

As explained above, it is possible to decide the ON/OFF timing of the first switching means 3 and the second switching means 4 based on the converter voltage Vc by applying unipolar modulation.

Descriptions are given to the modulation method that decides the ON/OFF timing of the first switching means 3 and the second switching means 4.

Next, distribution is explained of the ON/OFF timing of the first switching means 3 and the second switching means 4.

FIGS. 5(*b*) and 5(*c*) have the same polarity of the AC source 1 and Vc=V0/2 respectively, being in, what is called, a voltage doubler rectification condition. This implies that two circuit conditions to be Vc=V0/2 have to be configured in the same polarity of the AC source 1.

As for the circuit configuration of the figures, two capacitors are connected in series, and under conditions of FIGS. 5(*b*) and 5(*c*), either of the capacitor is to be charged.

When only one side capacitor is charged, the voltage across terminals of the capacitor loses balance, the condition Vc=V0/2 is lost, and the converter voltage Vc is distorted. The distortion of the Vc cause the input current I also to be distorted and harmonic current can no longer be suppressed.

Accordingly, well-balanced operation is required for the first switching means 3 and the second switching means 4 so that the first capacitor 6 and the second capacitor 7 are charged while keeping balance and Vc becomes half of the output DC voltage V0.

Contrary to the above, in the unipolar modulation explained in FIG. 9, the state in which only the first switching means 3 is ON and the state in which only the second switching means 4 is ON are alternatively generated. Therefore, the above problem can be avoided, and the unipolar modulation can be said to be a modulation method suitable for the present circuit configuration.

Well-balanced distribution of the operation timing of the switching means may allow other modulation methods to be employed such as bipolar modulation, dipolar modulation, and saw-tooth wave modulation.

Descriptions are given to distribution of the operation timing of the switching means. Next, a first diode 10 and a second diode 11 will be explained.

The first diode 10 and the second diode 11 do not conduct and becomes an OFF state under a normal condition, in which the first capacitor 6 and the second capacitor 7 connected in parallel have charges to have a positive voltage, so that they are not connected virtually.

On the other hand, under the condition in which no voltage is supplied from the AC source 1 and a certain power is dissipated in the DC load 8, the first capacitor 6 and the second capacitor 7 lose charges.

Then, the DC load 8 uniformly consumes charges from the first capacitor 6 and the second capacitor 7 connected in series. When there are variations in the capacitance of the first capacitor 6 and the second capacitor 7, charges in either capacitor are consumed and charges remain in the other capacitor. Resultantly, the output DC voltage V0 does not become 0.

Since the DC load 8 consumes charges until the output DC voltage V0 becomes 0, the capacitor whose charges are consumed first becomes negatively charged, that is, a negative voltage will be applied.

However, negative voltages cannot be applied to electrolytic capacitors having a voltage polarity.

Therefore, by connecting the first diode 10 and the second diode 11 in inverse-parallel to each capacitor respectively, the applied negative voltage is controlled not to exceed a forward direction voltage drop of the diode.

Thereby, failures of the capacitor can be prevented and reliability can be improved.

As mentioned above, the AC to DC converter 100 according to Embodiment 2 includes a first voltage detector 21 that detects the output DC voltage V0 and a second voltage detector 22 that detects the AC source voltage Vs to perform control based on these detected values.

Thereby, even if the voltage of the AC source 1 changes, power factor improvement effect can be maintained.

The AC to DC converter 100 according to Embodiment 2 can obtain a desired output DC voltage V0 by performing feedback control that performs feedback of detected values of the DC voltage to control command values.

The AC to DC converter 100 according to Embodiment 2 can properly distribute operation timing of each switching means to almost sinusoidally output the converter voltage vc to suppress harmonic current using a modulation method such as unipolar modulation.

Embodiment 3

Figure 10:
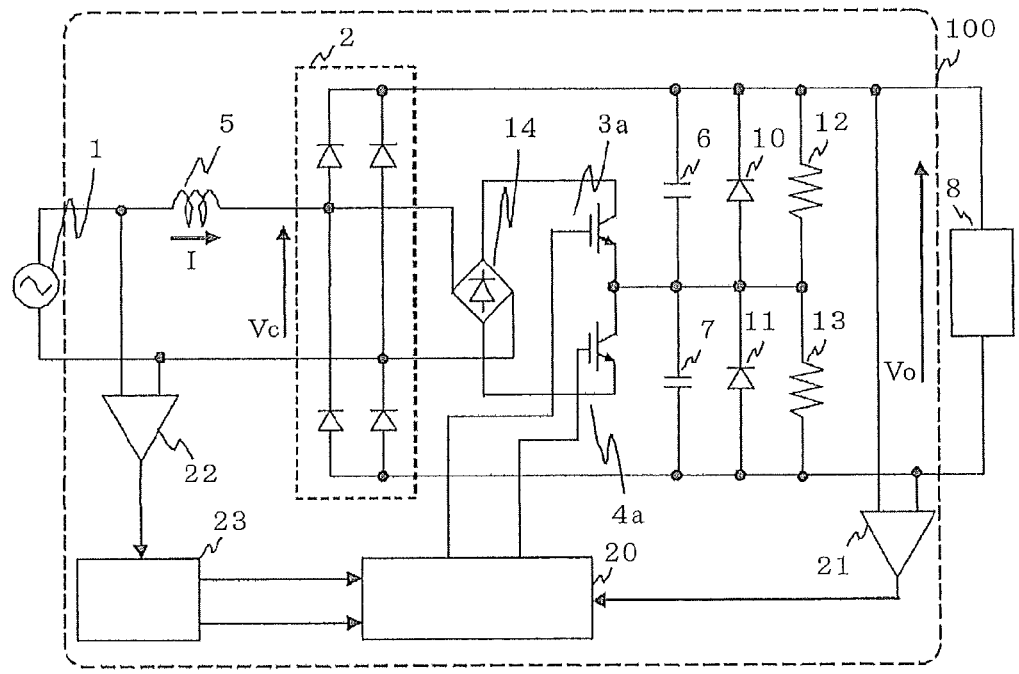
FIG. 10 is a circuit diagram of the AC to DC converter 100 according to Embodiment 3.

FIG. 10 is a circuit diagram of the AC to DC converter 100 according to Embodiment 3.

In the circuit of FIG. 10, configuration of the switching means is changed from the circuit configuration in FIG. 1. Other configurations are the same as FIG. 1.

In the circuit of FIG. 10, IGBT 3a and 4a, which are a unidirectional switching element, can perform an equivalent operation to the bidirectional switching means explained in FIG. 1 through a function of the diode rectifier 14.

Accordingly, in the circuit configuration of FIG. 10, the same control operation can be performed as those explained in Embodiments 1 and 2.

Because of the circuit configuration like FIG. 10, when IGBT 3a and 4a perform ON operation, the number of diodes in which current flow becomes half of FIG. 1. Therefore, conduction loss of the diode can be made to be half of the circuit configuration of FIG. 1.

Thereby, conversion efficiency of the AC to DC converter 100 can be improved.

Embodiment 4

Descriptions will be given to control operation that corrects on-state voltage drop of the switching means.

Figure 11:
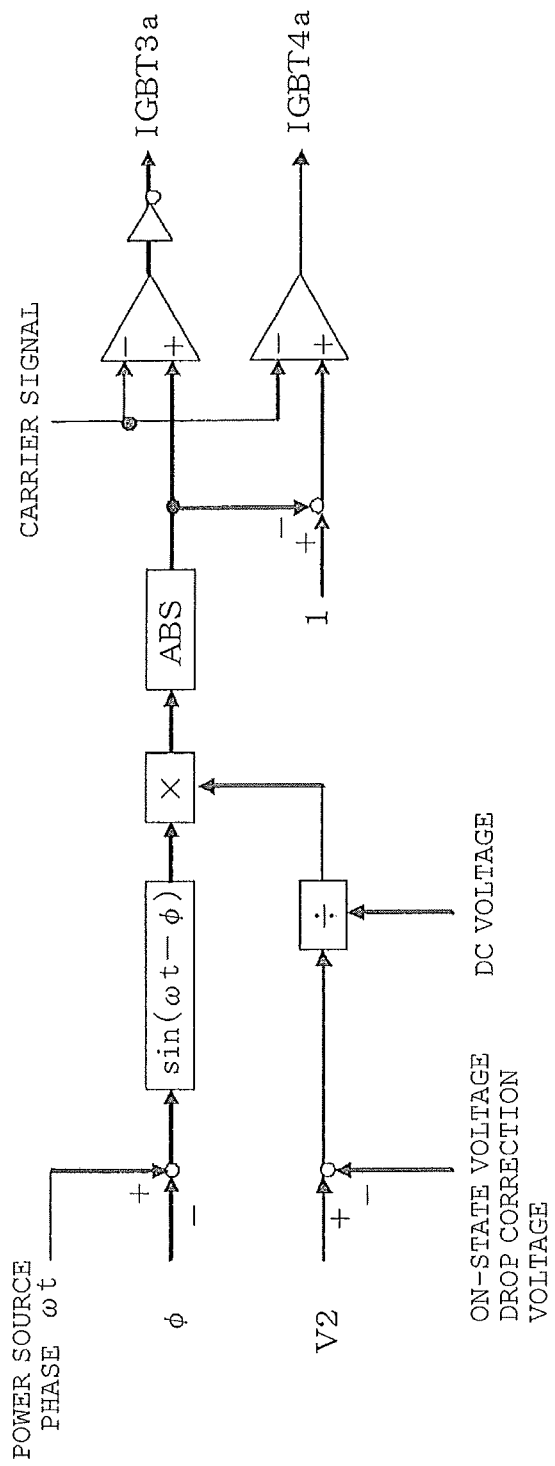
FIG. 11 is a control block diagram of control means 20 according to Embodiment 4.

FIG. 11 is a control block diagram of the control means 20 according to Embodiment 4.

The control block (not shown) explained in FIG. 7 is connected with the left stage of FIG. 11. Into the control block of FIG. 11, a phase angle $\phi$ and a amplitude V2 output by the control block of FIG. 7 are input.

Operation of the control block of FIG. 11 will be explained as follows.

The converter voltage Vc is output based on the voltage across the first capacitor 6 and the second capacitor 7. However, as shown in the circuit of FIGS. 1 and 10, the rectifier 2 composed of semiconductors and each switching means are connected between input terminals of the rectifier 2 and across each capacitor.

When semiconductors turn on, since an on-state voltage drop is generated, a voltage which is equal to or smaller than the voltage across each capacitor is output as the converter voltage Vc.

Then, the amplitude V2 is corrected using the on-state voltage drop of the semiconductor and PWM control is performed using a value after the correction. Thereby, error amount for the on-state voltage drop can be corrected.

Specifically, the voltage command value of the converter voltage can be obtained by calculating a ratio of the corrected voltage by the on-state voltage drop to the output DC voltage V0 to multiply it by the sin curve of the converter voltage Vc The above control operation can be represented by the left-half control block of FIG. 11.

When depicted simply, the ON/OFF timing of the switching means explained in FIG. 9 can be represented by the right-half control block of FIG. 11.

Descriptions are given to the on-state voltage drop of the switching means in the above.

Next, start procedure of the AC to DC converter 100 according to Embodiment 4 will be explained. Firstly, suppression of an inrush current will be explained. Then, suppression of an abrupt increase in the output DC voltage will be explained.

When both the first switching means 3 and the second switching means 4 are OFF and the DC load 8 consumes electric power, the current flows into each capacitor under the full-wave rectification state like FIG. 5(d).

Then, when the first switching means 3 and the second switching means 4 are made to turn on, a charging current flows through the first capacitor 6 and the second capacitor 7. The charging current becomes a large inrush current at the time of starting the AC to DC converter 100.

The large current is considered to be the inrush current generated by a change in the rectification state from the full-wave rectification state into the voltage doubler rectification state when either the first switching means 3 or the second switching means 4 is turned on.

A large inrush current at the time of starting the AC to DC converter 100 imposes a stress on every part of the AC to DC converter 100 such as each switching means and the rectifier 2. Therefore, it is desirable that the inrush current is suppressed as much as possible.

Accordingly, in Embodiment 4, the above-mentioned on-state voltage drop correction voltage will be employed.

Descriptions will be given to a method of suppressing the inrush current using the on-state voltage drop correction voltage.

In general, since the on-state voltage drop of a semiconductor is a positive value, the on-state voltage drop correction voltage becomes a positive value. When the value is made to be negative, a higher voltage is output than the amplitude V2 obtained by the control block of FIG. 7.

To increase the amplitude V2 of the converter voltage Vc is to increase the rate of a rectification state to output the DC voltage V0, that is, to increase the rate of the rectification state to be Vc=V0. That means to increase the rate of the rectification state of FIGS. 5(d) and 5(h).

In FIGS. 5(d) and 5(h), each switching means is in OFF state. It is a state in which the current flows through the capacitor under the full-wave rectification state.

Accordingly, by making the on-state voltage drop correction voltage to be an unrealistic negative value, the rate of the state of FIGS. 5(d) and 5(h), that is, the full-wave rectification state is increased, and it is possible to reduce the rate, in which only one switching means becomes ON-state to become the voltage doubler state.

Thereby, generation of the inrush current can be suppressed.

Descriptions are given to a method of suppressing the inrush current in the above.

Next, a method is explained for suppressing an abrupt increase in the output DC voltage.

When starting the AC to DC converter 100, the phase difference ϕ between the converter voltage Vc and the voltage Vs of the AC source 1 is reset to be 0. The output DC voltage V0 is increased after the start-up.

In order to increase the output DC voltage V0, the phase difference ϕ may be delayed. Therefore, control is performed such that the phase difference ϕ is delayed after starting the AC to DC converter 100. Then, an abrupt increase in the output DC voltage may cause hunching of the control system in some cases.

Accordingly, in Embodiment 4, the phase difference ϕ is set to be an advanced phase side (−10 degree, for example) at the time of starting the AC to DC converter 100.

Thereby, whether the DC load 8 is a light load or a heavy load, it is possible to suppress an abrupt increase in the output DC voltage to achieve a soft start-up.

As mentioned above, according to Embodiment 4, since control is performed while correcting the on-state voltage drop of the switching means, the power source power factor can be improved (4 to 7%, for example) more than the time without the correction.

According to Embodiment 4, it is possible to increase the rate of the full-wave rectification state to suppress the generation of the inrush current by making the on-state voltage drop correction voltage to be a negative value when starting the AC to DC converter 100.

After the start-up, by making the on-state voltage drop correction voltage to be a positive value as usual, while achieving a soft start-up, the above-mentioned power factor improvement effect can be demonstrated.

According to Embodiment 4, it is possible to suppress an abrupt increase in the output DC voltage after the start-up because the phase difference ϕ is made to be a negative value at the time of starting the AC to DC converter 100.

Embodiment 5

FIG. 12 is a circuit diagram of the AC to DC converter 100 according to Embodiment 5.

The circuit of FIG. 12 includes a current detector 24 and a zero-cross detector 25 in place of the second voltage detector 22 and the effective value operation portion 23 in the circuit configuration explained in FIG. 1.

In the circuit configuration explained in FIG. 1, the lowering of the power factor due to the voltage changes of the AC source 1 is coped with using detection results of the second voltage detector 22.

In Embodiment 5, the input current is detected using the current detector 24 instead thereof. Using the detection results, the power factor lowering is handled.

As explained in FIGS. 8(a) and 8(b), when the phase of the input current is in a lagging phase, the voltage Vs of the AC source 1 becomes larger than the rated voltage Va. In the case of an advanced phase, the voltage Vs of the AC source 1 becomes smaller than the rated voltage Va.

Therefore, firstly, the input current is detected using the current detector 24 to detect an instantaneous phase angle θ (represented by ωt in Embodiments 1 to 4) of the AC source 1.

Supposing that the voltage waveform of the AC source 1 is represented by a sin-function, it is possible to detect a zero-cross point of the instantaneous phase angle θ using detection results of the zero-cross detector 25.

By calculating cos θ from the phase angle to multiply it by the input current, the reactive component of the AC source 1 can be obtained.

When the reactive component of the input current is 0, the power factor=1. When the phase difference ϕ between the converter voltage Vc and the supply voltage Vs is too delayed, the reactive component of the input current becomes positive. When the phase difference ϕ is too much advanced, the reactive component of the input current becomes negative.

Therefore, the amplitude V2 is corrected only by the generation amount of the reactive current in the same way as the on-state voltage drop correction voltage explained in Embodiment 4. Thereby, feedback control becomes effective so that the phase of the input current becomes the same phase as that of the AC source 1 to prevent the power factor from being lowered.

When detecting the power factor of the power source using the voltage and the current of the AC source 1, the lowering of the power factor may be detected, however, it is not possible to detect whether the phase is advanced or delayed. Therefore, it is not easily decided whether to make the correction voltage to be positive or negative.

As for the reactive component of the current, since a sign changes according to an advanced phase or a lagging phase, the polarity of the correction voltage can be easily obtained.

Embodiment 6

Figure 13:
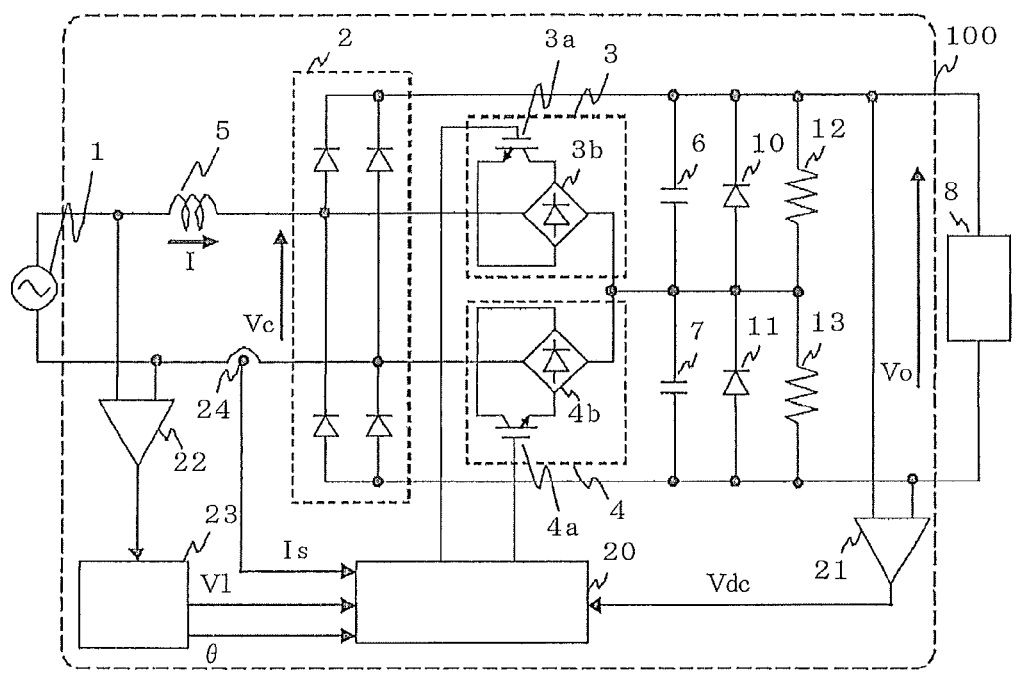
FIG. 13 is a circuit diagram of the AC to DC converter 100 according to Embodiment 6.

FIG. 13 is a circuit diagram of the AC to DC converter 100 according to Embodiment 6.

Being different from the circuit configuration of Embodiment 5, the circuit of FIG. 13 concurrently uses the second voltage detector 22 and the current detector 24.

Thereby, even if a detection variation of, for example, about 5 to 10% exists in either the second voltage detector 22 or the current detector 24, the lowering of the power factor can be suppressed by the control block to be explained in the following FIG. 14.

Figure 14:
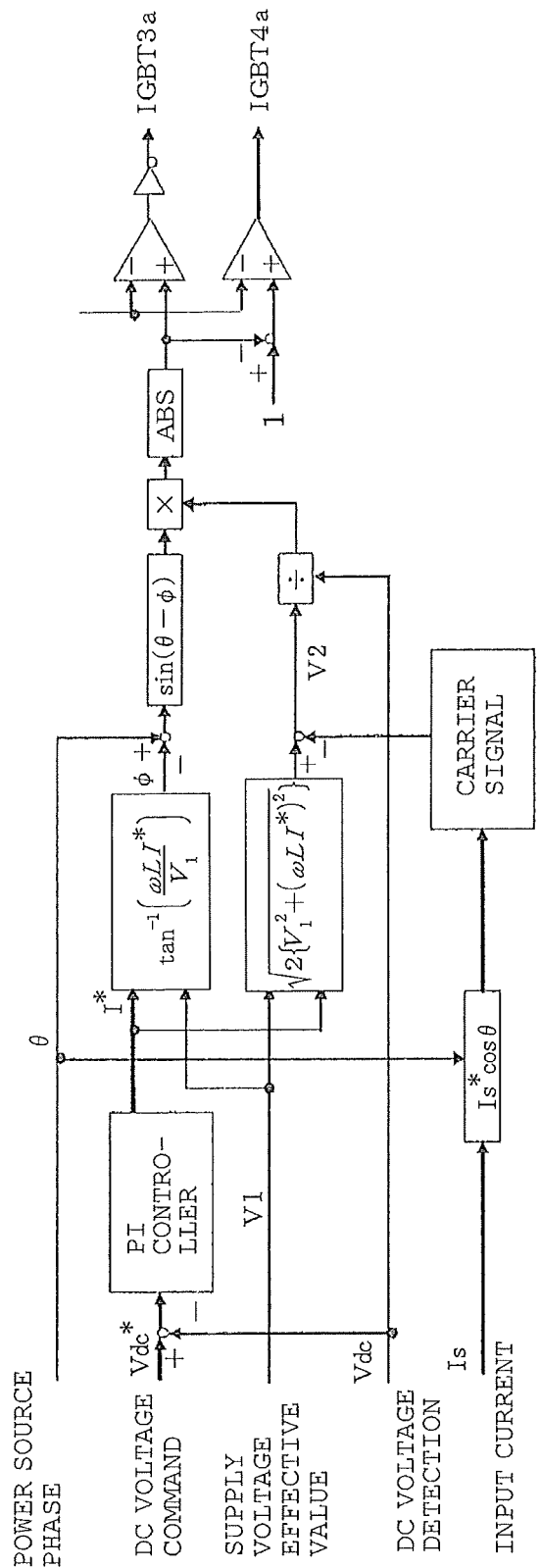
FIG. 14 is a control block diagram of control means 20 according to Embodiment 6.

FIG. 14 is a control block diagram of control means 20 according to Embodiment 6.

As shown in FIG. 14, in Embodiment 6, when the supply voltage changes, the effective value of the supply voltage is detected, and at the same time, the reactive component of the input current is detected. These detected values are used for the control.

Thereby, an affect of detection variations of the second voltage detector 22 and the current detector 24 is suppressed and a smooth start-up of the AC to DC converter 100 becomes possible.

The control block diagram of FIG. 14 is configured such that the amplitude V2 is corrected in the same way as the on-state voltage drop correction voltage to make the reactive component of the input current to be 0, however, it may be configured to directly calculate the amplitude V2.

In the latter case, it is only necessary to calculate the phase difference $\phi$ from the reactive current to perform control of the output DC voltage using the amplitude V2.

The circuit configuration and the control block explained above perform feedback control so that the output DC voltage becomes a constant based on the principle explained in FIG. 3.

Other circuit configurations and control blocks may be used if they can perform feedback control of the output DC voltage based on a similar principle to improve the power factor and suppress the harmonics current even when changes of the power source voltages and detection variations of the detector exist.

Embodiment 7

Figure 15:
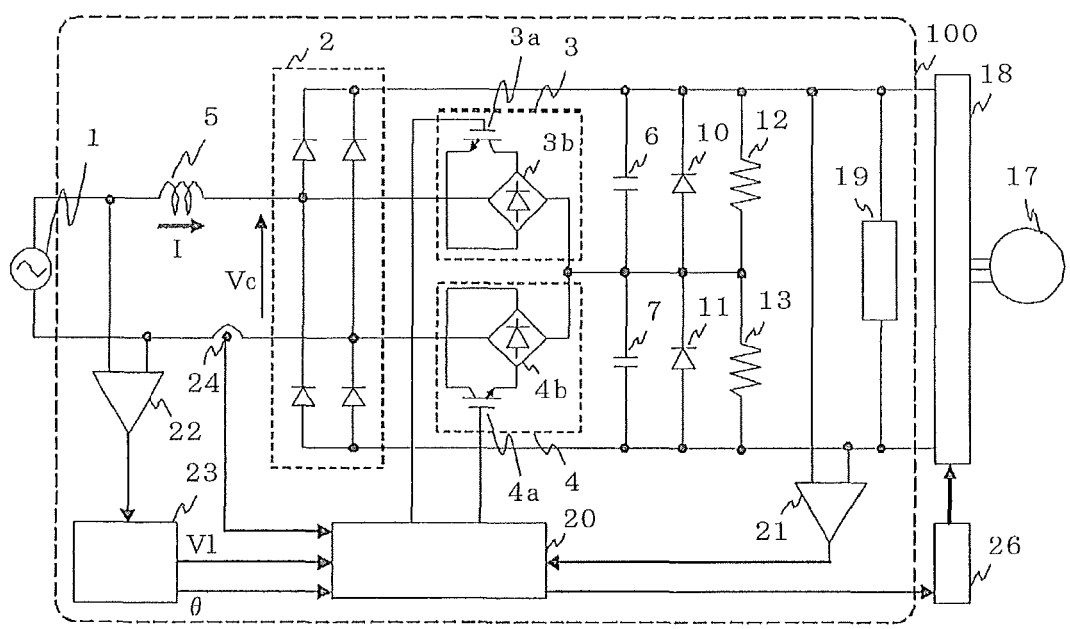
FIG. 15 is a circuit diagram of the AC to DC converter 100 according to Embodiment 7.

FIG. 15 is a circuit diagram of the AC to DC converter 100 according to Embodiment 7.

In the circuit of FIG. 15, the DC load 8 in the circuit diagram explained in FIG. 13 is replaced by the inverter 18 and the permanent magnet motor 17. Further, a voltage clamp portion 19 is provided at the output end of the AC to DC converter 100. Moreover, an inverter control portion 26 is provided that controls the operation of the inverter 18.

The inverter control portion 26 may be constituted by hardware such as a circuit device that achieves its function or may be configured by an operation device such as a microcomputer and CPU and software that specifies its operation.

The "voltage increase suppression means" according to Embodiment 7 corresponds to the voltage clamp portion 19.

The "motor deceleration means" corresponds to the control means 20, the inverter 18, and the inverter control portion 26.

The operation of the AC to DC converter 100 according to Embodiment 7 is almost the same as those explained in Embodiments 1 to 6. Descriptions will be given to the replacement of the load by the inverter 18 and the permanent magnet motor 17 in particular.

Firstly, it will be explained that using the circuit of FIG. 15 as a motor driver, degree of freedom in a motor design can be enhanced. Thereafter, descriptions will be given to a configuration that suppresses an instantaneous abnormal voltage increase, then an operation that safely drives the motor.

(1) Degree of Freedom in Motor Design

The smaller the current necessary for outputting the same torque, the smaller the copper loss (a resistance times square of the current) of the motor.

For example, in the case of a permanent magnet synchronous motor, a torque by a permanent magnet increases by making an induced voltage constant of the motor larger, therefore, the same torque can be output when the current is reduced.

When the current is reduced, effects are demonstrated that reduce the conduction loss and switching loss of the inverter that drives the motor.

Accordingly, to make the induced voltage constant of the motor larger to reduce the current is said to be the most effective for means of high efficiency.

Like a motor used for an air-conditioner, if a motor is designed to operate at high efficiency during a low-speed rotation for long operation time, the induced voltage constant of the motor increases.

In the case of a high-speed rotation of the motor at the time of rapid cooling and rapid heating, since larger induced voltage constant requires higher voltage at the same rotation speed, the DC voltage necessary for the inverter to drive the motor also increases.

There were restrictions in the past for designing the specification of the motor in consideration of the relation between the maximum rotation speed and the DC voltage.

As mentioned above, it is possible to improve efficiency of the motor by boosting the DC voltage to increase the induced voltage constant. On the contrary, when increasing the output DC voltage V0 of the AC to DC converter 100 for supplying the high DC voltage, conversion efficiency of the AC to DC converter 100 is lowered.

In other words, the power factor of the AC to DC converter 100 is extremely lowered and harmonic current increases.

For example, when performing high-frequency PWM control like the technique described in Patent Literature 7, the output DC voltage V0 can be increased. However, the loss increases as much, exceeding the loss reduction effect of the AC to DC converter 100.

Because of the above reasons, with the conventional technique, it is difficult to provide a high-efficiency motor driver even when the DC voltage is increased to make the induced voltage constant large.

On the other hand, with the AC to DC converter 100 according to the present invention, since control operation can be performed at a low carrier frequency, high efficiency conversion operation becomes possible by suppressing the lowering of the power factor while increasing the output voltage.

Thereby, the motor can be designed to have better efficiency at a low-speed operation and when operating the motor at high speed, the output DC voltage of the AC to DC converter 100 can be increased to secure the maximum rotation speed.

Accordingly, it is possible to improve efficiency at low-speed driving, in other words, under normal use without lowering the performance of the air-conditioner even at the time of overload operation such as rapid cooling and rapid warming.

In addition, at the time of high-speed rotation and low-speed rotation of the motor, since required DC voltage is different, for example in the case of the low-speed rotation, the conventional control method like FIG. 2 may sometimes be suitable for use in place of the control in which three-level almost sinusoidal waves like FIG. 4 are output.

To cope with the above, such as a sensor for detecting the rotation speed of the permanent magnet motor 17 and an operation portion for obtaining the rotation speed by operation are provided.

With the control means 20, the permanent magnet motor 17, the inverter 18, and the AC to DC converter 100 can be made to be totally high efficient by switching the method for controlling between the method of FIG. 2 and that of FIG. 4 according to the rotation speed of the permanent magnet motor 17.

Further, in the control method of FIG. 2, pulse operation of several times can be performed for each half a cycle of the power supply. However, the number of the pulse is preferable that does not increase the amount of noise generation.

In place of the rotation speed of the permanent magnet motor 17, the applied voltage may be detected, and control method may be switched between the method of FIG. 2 and that of FIG. 4.

(2) Suppression of Instantaneous Abnormal Voltage Increase

As mentioned above, a motor having a high induced voltage constant produces a large amount of power generation when performing free-running at high-speed rotation. This phenomenon becomes problematic at the time of stopping the permanent magnet motor 17.

When the permanent magnet motor 17 is stopped during high-speed rotation, the amount of power generation by the rotation energy then is supplied from the permanent magnet motor 17 to the first capacitor 6 and the second capacitor 7 through the inverter 18.

The AC to DC converter 100 according to the present invention is a regeneration type converter, therefore, no supplied energy can be consumed.

Accordingly, by the energy generated at the time of stopping the permanent magnet motor 17, the output DC voltage is made to increase, which is the voltage across both the first capacitor 6 and the second capacitor.

In order to avoid an extreme increase in the output DC voltage, when stopping the permanent magnet motor 17, it is necessary to stop the motor after deceleration such that no extreme increase in voltage occurs.

However, the permanent magnet motor 17 sometimes steps out into stoppage due to such as poor torque.

In this case, there is not much time to decelerate the permanent magnet motor 17, and some induced voltage constant of the permanent magnet motor 17 may cause the voltage exceeding withstand voltage of the first capacitor 6 and the second capacitor 7 to be applied to each capacitor.

Therefore, the AC to DC converter 100 according to Embodiment 7 is equipped with a voltage clamp portion 19 that suppresses an instantaneous abnormal voltage increase.

The voltage clamp portion 19 may be constituted by a surge clamper, a surge absorber, or a series circuit of a resistor and an IGBT. Other configurations may be used that can suppress the instantaneous abnormal voltage increase.

(3) Operation that Stably Operates the Motor.

When the voltage of the AC source 1 is lowered, the AC to DC converter 100 performs control such that the output DC voltage is made to be constant up to a control limit of the output DC voltage. However, the source voltage is lowered beyond the control limit, the output DC voltage cannot be increased, resulting in the lowering of the output DC voltage.

If the permanent magnet motor 17 continues to rotate at the same rotation speed even when the output DC voltage is lowered, the permanent magnet motor 17 steps out into stoppage due to poor torque caused by poor DC voltage.

Then, the control means 20 commands the inverter control portion 26 to control the inverter 18 so as to decelerate the permanent magnet motor 17 when the second voltage detection means 22 detects the lowering of the source voltage.

Then, regeneration energy by the deceleration of the permanent magnet motor 17 is regenerated into the first capacitor 6 and the second capacitor 7 to make the output DC voltage to increase.

Thereby, necessary DC voltage can be secured and no step-out occurs in the permanent magnet motor 17.

Moreover, a drop in the rotation speed of the permanent magnet motor 17 causes a decrease in the DC voltage value to be a limit to the step-out, therefore, the permanent magnet motor 17 hardly steps out into stoppage.

As mentioned above, in Embodiment 7, a motor driving apparatus is configured that drives a motor having a high induced voltage constant using the AC to DC converter 100.

Thereby, operation efficiency of the whole motor driving apparatus is improved and energy-saving effect can be improved.

According to Embodiment 7, the voltage clamp portion 19 suppresses an instantaneous abnormal voltage increase to protect the first capacitor 6 and the second capacitor 7 from an excess voltage.

Further, according to Embodiment 7, the motor can be prevented from stepping out into stoppage because the motor is made to stop after deceleration.

For example, the motor is desirable to continue operation without stop as much as possible because stoppage of the motor causes an increase in the temperature in a freezer to increase the storage temperature when the motor is used in a freezer and the like.

In embodiment 7, since the second voltage detector 22 is used to detect a drop in the source voltage to make the AC to DC converter 100 and the inverter 18 to cooperatively operate, it is possible to provide a motor driver that is hard to stop even when instantaneous power failure occurs.

It is also possible to provide a compressor driver that drives a compressor using the motor.

Embodiment 8

The AC to DC converter 100 explained in Embodiments 1 to 7 can be utilized for a power unit for the load that consumes electric power in DC.

For example, the converter is applicable to home electronic appliances in general such as an air-conditioner, a freezing machine, a washing and drying machine, a refrigerator, a dehumidifier, a heat pump type water heater, a showcase, and a vacuum cleaner. In addition, it is applicable to a fan motor, a ventilator, and a hand drier, as well.

The invention claimed is:

1. An AC to DC converter, comprising:
   a rectifier connected with an AC source through a reactor,
   a plurality of capacitors connected between output terminals of said rectifier in series,
   first switching means connected between one input terminal of said rectifier and a connection point of said plurality of capacitors,
   second switching means connected between the other input terminal of said rectifier and the connection point of said plurality of capacitors, and
   a plurality of diodes connected with said plurality of capacitors in inverse-parallel,
   wherein, during half a period of said AC source, said rectifier drives and controls said switching means such that said rectifier outputs a substantially sinusoidal waveform in four rectification states: a full-wave rectification state, a first voltage doubler rectification state, a second voltage doubler rectification state, and power unit short-circuited state.

2. The AC to DC converter of claim 1, wherein
   a plurality of resistors is provided connected with said capacitors.

3. The AC to DC converter of claim 1, wherein
   said control means controls at least either the amplitude of the voltage between input terminals across said rectifier or the phase difference of the voltage of said AC source and the voltage between input terminals across said rectifier to control the terminal voltage across said plurality of capacitors to be a desired voltage.

4. The AC to DC converter of claim 3, wherein
said control means corrects the voltage drop of said rectifier and said switching means.

5. The AC to DC converter of claim 4, wherein
said control means sets the correction value of said voltage drop to be a value such that the terminal voltage across said plurality of capacitors becomes a desired voltage only when said AC to DC converter starts operation.

6. The AC to DC converter of claim 3, wherein
said control means sets the phase difference between the voltage of said AC source and the voltage between input terminals of said rectifier such that the voltage between input terminals of said rectifier becomes an advanced phase
only when said AC to DC converter starts operation.

7. A method for controlling the AC to DC converter of claim 1, wherein
a voltage between terminals of each plurality of capacitors is made to be balanced.

8. A motor driver comprising:
the AC to DC converter of claim 1, and
an inverter that converts DC power that said AC to DC converter outputs to AC power to drive a permanent magnet motor, wherein
said inverter stops said permanent magnet motor after decelerating the rotation speed of said permanent magnet motor to a predetermined rotation speed or less when stopping said permanent magnet motor.

9. A motor driver comprising:
the AC to DC converter of claim 1,
an inverter that converts DC power that said AC to DC converter outputs to AC power to drive a permanent magnet motor, and
voltage increase suppressing means that suppresses an abrupt increase in voltage of said plurality of capacitors.

10. A compressor driver comprising:
the AC to DC converter of claim 1, and
an inverter that converts DC power that said AC to DC converter outputs to AC power to drive a permanent magnet motor, wherein
said permanent magnet motor drives a compressor.

11. An air conditioner, wherein
a refrigerant is made to circulate by the compressor driver of claim 10.

12. A heat pump type water heater, wherein
the compressor driver of claim 10 circulates a refrigerant to heat water.

13. A compressor driver comprising:
the AC to DC converter of claim 1,
an inverter that converts DC power that said AC to DC converter outputs to AC power to drive a permanent magnet motor, and
means that detects a rotation speed or an applied voltage of said permanent magnet motor, wherein
said control means turns on at least one of said switching means at least once during half a cycle of said motor when either the rotation speed of said permanent magnet motor or an applied voltage becomes a predetermined value or less.

14. An AC to DC converter, comprising:
a rectifier connected with an AC source through a reactor,
a plurality of capacitors connected between output terminals of said rectifier in series,
a plurality of switching means connected between input terminals of said rectifier in series, and
a plurality of diodes connected with said plurality of capacitors in reverse-parallel, wherein
a connection point of said plurality of capacitors and that of the plurality of switching means are connected,
wherein, during half a period of said AC source, said rectifier drives and controls said switching means such that said rectifier outputs a substantially sinusoidal waveform in four rectification states: a full-wave rectification state, a first voltage doubler rectification state, a second voltage doubler rectification state, and power unit short-circuited state.

15. An AC to DC converter, comprising:
a rectifier connected with an AC source through a reactor,
a plurality of capacitors connected between output terminals of said rectifier in series,
first switching means connected between one input terminal of said rectifier and a connection point of said plurality of capacitors,
second switching means connected between the other input terminal of said rectifier and a connection point of said plurality of capacitors,
a plurality of diodes connected with said plurality of capacitors in inverse-parallel,
a first voltage detector that detects voltages across said plurality of capacitors,
a second voltage detector that detects the voltage of said AC source, and
control means that drives and controls said switching means, wherein
said control means drives and controls said switching means to control the voltage between input terminals of said rectifier based on detection results of said first voltage detector and said second voltage detector so that the voltage across said plurality of capacitors becomes a desired voltage.

16. A motor driver comprising:
the AC to DC converter of claim 15,
an inverter that converts DC power that said AC to DC converter outputs to AC power to drive a permanent magnet motor,
a motor deceleration means that decelerates said permanent magnet motor to avoid stoppage of said permanent magnet motor when said second voltage detection means detects the voltage that is equal to or less than a predetermined voltage.

17. An AC to DC converter, comprising:
a rectifier connected with an AC source through a reactor,
a plurality of capacitors connected between output terminals of said rectifier in series,
first switching means connected between one input terminal of said rectifier and a connection point of said plurality of capacitors,
second switching means connected between the other input terminal of said rectifier and a connection point of said plurality of capacitors,
a plurality of diodes connected with said plurality of capacitors in inverse-parallel,
a first voltage detector that detects the voltage across said plurality of capacitors,
a first current detector that detects the current of said AC source, and
control means that drives and controls said switching means, wherein said control means drives and controls said switching means to control the voltage between input terminals of said rectifier based on detection results of said first voltage detector and said first current detector so that the voltage across said plurality of capacitors becomes a desired voltage.

18. The AC to DC converter of claim 17, wherein
said control means controls at least either the amplitude of the voltage between input terminals across said rectifier or the phase difference of the voltage of said AC source and the voltage between input terminals across said rectifier such that a reactive component of the current detected by said first current detector becomes 0
to control the terminal voltage across said plurality of capacitors to be a desired voltage.

19. The AC to DC converter of claim 17, wherein
said control means controls at least either the amplitude of the voltage between input terminals across said rectifier or the phase difference of the voltage of said AC source and the voltage between input terminals across said rectifier
to control the terminal voltage across said plurality of capacitors to be a desired voltage.

20. An AC to DC converter, comprising:
a rectifier connected with an AC source through a reactor,
a plurality of capacitors connected between output terminals of said rectifier in series,
first switching means connected between one input terminal of said rectifier and a connection point of said plurality of capacitors,
second switching means connected between the other input terminal of said rectifier and a connection point of said plurality of capacitors,
a plurality of diodes connected with said plurality of capacitors in inverse-parallel,
a first voltage detector that detects voltages across said plurality of capacitors,
a second voltage detector that detects the voltage of said AC source,
a first current detector that detects the current of said AC source, and
control means that drives and controls said switching means, wherein
said control means drives and controls said switching means to control the voltage between input terminals of said rectifier based on detection results of said first voltage detector, said second voltage detector, and said first current detector so that the voltage across said plurality of capacitors becomes a desired voltage.

21. The AC to DC converter of claim 20, wherein
said control means controls at least either the amplitude of the voltage between input terminals across said rectifier or the phase difference of the voltage of said AC source and the voltage between input terminals across said rectifier
to control the terminal voltage across said plurality of capacitors to be a desired voltage.

* * * * *